(12) United States Patent
Zhang et al.

(10) Patent No.: US 11,050,287 B2
(45) Date of Patent: Jun. 29, 2021

(54) BATTERY PACK SYSTEM AND ITS CONTROL METHOD, MANAGEMENT DEVICE

(71) Applicant: Contemporary Amperex Technology Co., Limited, Ningde (CN)

(72) Inventors: Wei Zhang, Ningde (CN); Zhimin Dan, Ningde (CN); Yizhen Hou, Ningde (CN); Xiyang Zuo, Ningde (CN); Wenbin Lu, Ningde (CN); Xingyuan Wu, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 205 days.

(21) Appl. No.: 16/235,261

(22) Filed: Dec. 28, 2018

(65) Prior Publication Data

US 2019/0363563 A1 Nov. 28, 2019

(30) Foreign Application Priority Data

May 22, 2018 (CN) .......................... 201810495574.9

(51) Int. Cl.
*H02J 7/00* (2006.01)
*H01M 10/46* (2006.01)
(Continued)

(52) U.S. Cl.
CPC ......... *H02J 7/0091* (2013.01); *H01M 10/425* (2013.01); *H01M 10/443* (2013.01);
(Continued)

(58) Field of Classification Search
None
See application file for complete search history.

(56) References Cited

U.S. PATENT DOCUMENTS

2011/0144861 A1 6/2011 Lakirovich et al.
2012/0299551 A1 11/2012 Xu et al.

FOREIGN PATENT DOCUMENTS

CN 102074752 A 5/2011
CN 102470760 A 5/2012
(Continued)

OTHER PUBLICATIONS

The first Official Action and search report dated Oct. 14, 2019 for Chinese application No. 201810495574.9, 9 pages.
(Continued)

*Primary Examiner* — Kaity V Chandler
(74) *Attorney, Agent, or Firm* — Law Offices of Liaoteng Wang

(57) ABSTRACT

A battery pack system includes a battery pack, a battery management module, a discharge circuit module, a charge circuit module and an energy storage module. The battery pack is connected to the discharge circuit module in series and the battery pack is connected to the charge circuit module in series. The battery management module is configured to monitor a temperature of the battery pack, and if the temperature is lower than a first temperature threshold, send a switch-on instruction to the discharge circuit module and the charge circuit module alternately at a regulation frequency. The discharge circuit module is configured to switch on according to the switch-on instruction to enable electricity of the battery pack to flow into the energy storage module. The charge circuit module is configured to switch on according to the switch-on instruction to enable electricity of the energy storage module to flow into the battery pack.

17 Claims, 4 Drawing Sheets

(51) Int. Cl.
 *H01M 10/42* (2006.01)
 *H01M 10/44* (2006.01)
(52) U.S. Cl.
 CPC ........... *H01M 10/46* (2013.01); *H02J 7/0021* (2013.01); *H02J 7/00718* (2020.01); *H01M 2010/4271* (2013.01)

(56) References Cited

FOREIGN PATENT DOCUMENTS

| | | | | | |
|---|---|---|---|---|---|
| CN | 103419650 | A | 12/2013 | | |
| CN | 103560307 | A | 2/2014 | | |
| CN | 104578237 | | * | 4/2015 | ............ H01M 10/46 |
| CN | 102742068 | B | 1/2016 | | |
| CN | 104638318 | B | 11/2016 | | |
| JP | 2007014148 | A | 1/2007 | | |
| WO | 2013174273 | A1 | 11/2013 | | |

OTHER PUBLICATIONS

The extended European search report dated Jul. 4, 2019 for European application No. 19150230.1, 10 pages.
The third Official Action and search report dated Mar. 3, 2021 for Chinese application No. 201810495574.9, 9 pages.

\* cited by examiner

BATTERY PACK SYSTEM AND ITS CONTROL METHOD, MANAGEMENT DEVICE

CROSS-REFERENCE TO RELATED APPLICATION

This application is based on and claims priority to Chinese Patent Application No. 201810495574.9 filed on May 22, 2018, which is incorporated herein by reference in its entirety.

FIELD

The present application relates to the field of battery technology, and more particularly to a battery pack system and its control method, management device.

BACKGROUND

With the widespread use of new energy, a battery pack may be applied in various fields as a power source. The environment in which the battery pack is used as a power source may vary, and the performance of the battery pack may also be affected. For example, the performance of the battery pack under a low temperature environment may be reduced greatly compared with that of a normal temperature environment. For example, at zero degree, the discharge capacity of the battery pack may decrease as the temperature decreases. At $-30°$ C., the discharge capacity of the battery pack may be substantially zero, making the battery pack unusable.

In order to use the battery pack in a low temperature environment, the battery pack needs to be preheated before it is used. At present, the battery pack may be preheated with a battery insulation film heating method. The battery insulation film heating method comprises adding a heating plate or a heating film between battery cells, taking electricity from the power grid, and heating the heating plate or the heating film to heat the battery pack. However, it takes a long time to heat the battery pack using the battery insulation film heating method, for example, it may take several hours to heat the battery pack temperature from $-30°$ C. to $0°$ C., which may affect the use of the battery pack.

SUMMARY

Embodiments of the present disclosure may provide a battery pack system and its control method, management device.

In a first aspect, embodiments of the present disclosure may provide a battery pack system, comprising: a battery pack, a battery management module, a discharge circuit module, a charge circuit module and an energy storage module; the battery pack may be connected to the discharge circuit module in series and the battery pack may be connected to the charge circuit module in series; the battery management module may be connected to the discharge circuit module, the charge circuit module and the battery pack, and may be configured to monitor a temperature of the battery pack, if the temperature of the battery pack is lower than a first temperature threshold, send a switch-on instruction to the discharge circuit module and the charge circuit module alternately at a regulation frequency, so as to control the discharge circuit module and the charge circuit module to be switched on alternately; the discharge circuit module may be connected to the energy storage module, and may be configured to switch on according to the switch-on instruction to enable the electricity of the battery pack to flow into the energy storage module; the charge circuit module may be connected to the energy storage module, and may be configured to switch on according to the switch-on instruction to enable the electricity of the energy storage module to flow into the battery pack; the energy storage module may be configured to store and release the electricity.

In a second aspect, embodiments of the present disclosure may provide a control method that may be used in the battery pack system in the above technical solution, the control method may comprise: monitoring the temperature of the battery pack; sending the switch-on instruction to the discharge circuit module and the charge circuit module alternately at a regulation frequency if the temperature of the battery pack is lower than the first temperature threshold, to enable a transfer of electricity between the battery pack and the energy storage module.

In a third aspect, embodiments of the present disclosure may provide a management device that may comprise: a memory, a processor, and a program stored in the memory and executable on the processor, the processor may, when executing the program, implement the battery system control method in the above technical solution.

BRIEF DESCRIPTION OF THE DRAWINGS

The present disclosure may be better understood from the following description of specific embodiments of the present disclosure in conjunction with the accompanying drawings, wherein same or similar reference numerals represent same or similar features.

DETAILED DESCRIPTION

The features and exemplary embodiments of various aspects of the present disclosure will be described in detail below. In the following detailed description, numerous specific details are set forth in order to provide a thorough understanding of the present disclosure. However, it will be apparent to those skilled in the art that the present disclosure may be practiced without some of these specific details. The following description of the embodiments is merely intended to provide a better understanding of the present disclosure by illustrating examples of the present disclosure. The present disclosure is by no means limited to any specific configuration and algorithm provided blow, but covering any modification, substitution and improvement of elements, components and algorithm without departing from the spirit of the present disclosure. In the accompanying drawings and the following description, well-known structures and techniques are not illustrated as so to avoid unnecessarily obscuring the present disclosure.

Embodiments of the present disclosure may provide a battery pack system and its control method, which may be used in a device powered by the battery pack to rapidly heat the battery pack in a low temperature environment. Devices powered by a battery pack may be electrically driven transportation vehicles such as electric cars, electric boats, etc. Devices powered by a battery pack may also be electric devices in other fields, such as the military field. The battery pack may be a battery module or a battery package, which is not limited herein.

Devices powered by a battery pack may need to operate in a low temperature environment in some cases, for example, electric vehicles travel in an environment in which the temperature is lower than 0° C. in winter. In a low temperature environment, due to the phenomenon of increased electrolyte viscosity and severe precipitation of lithium in the negative electrode material of the battery pack, it may be difficult for devices powered by a battery pack to operate in the low temperature environment. In order for devices powered by a battery pack to operate normally in a low temperature environment, the battery pack may need to be preheated. In embodiments of the present disclosure, the battery pack may be provided with a battery pack system, and the battery pack and the energy storage module may transmit electricity to each other. During the mutual transmission of electricity, a current may flow inside the battery pack and between other parts of the battery pack system, generating heat inside the battery pack. The heat generated inside the battery pack may heat the battery pack from the inside, which may speed up the heating of the battery pack and reduce the time required to heat the battery pack, facilitating the devices to operate based on the electricity provided by the battery pack as soon as possible in the low temperature environment.

Figure 1:
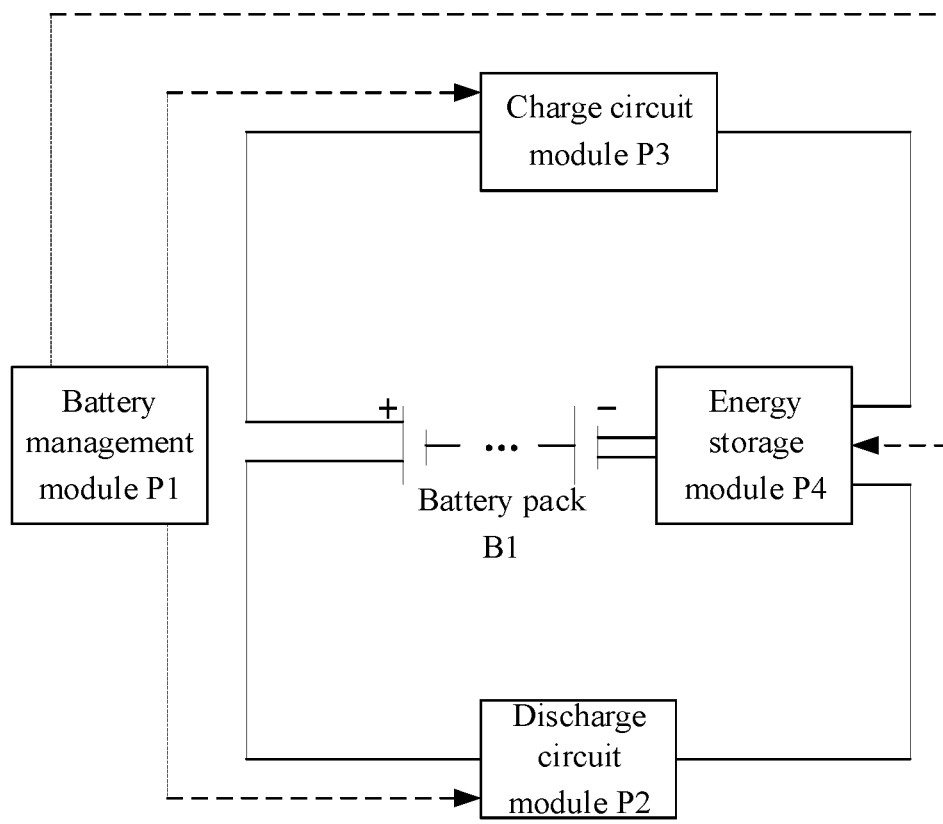
FIG. 1 is a structure diagram of a battery pack system according to an embodiment of the present disclosure.

The battery pack will be illustrated blow by taking a power battery pack in an electric vehicle as an example. FIG. 1 is a structure diagram of a battery pack system according to an embodiment of the present disclosure. As shown in FIG. 1, the battery pack system may comprise a battery pack B1, a battery management module P1, a discharge circuit module P2, a charge circuit module P3 and an energy storage module P4. The dotted arrows in FIG. 1 may refer to communication connections, which may be wired connections or wireless connections and not limited herein. For example, the battery management module P1 may transmit information to the discharge circuit module P2, the charge circuit module P3 and the battery pack B1 by a Controller Area Network (CAN) bus. The information transmitted in the communication connections may comprise a switch-on instruction, temperature information, etc., which is not limited herein. The solid lines in FIG. 1 may refer to electrical connections.

The battery pack B1 may be connected to the discharge circuit module P2 and the charge circuit module P3 in series.

The battery pack B1 may be a power battery pack in an electric vehicle, i.e., the battery pack may be arranged inside an electric vehicle.

The battery management module P1 may be connected to the discharge circuit module P2, the charge circuit module P3 and the battery pack B1. The battery management module P1 may be configured to monitor a temperature of the battery pack B1, and if the temperature of the battery pack B1 is lower than a first temperature threshold, send a switch-on instruction to the discharge circuit module P2 and the charge circuit module P3 alternately at a regulation frequency, so as to control the discharge circuit module P2 and the charge circuit module P3 to be switched on alternately.

In one example, the battery management module P1 may be a Battery Management System (BMS), or a function module disposed separately, which is not limited herein. A temperature sensor for measuring the temperature may be disposed on the surface of the battery pack B1 or inside the battery pack B1, and the temperature sensor may transmit the measured temperature of the battery pack B1 to the battery management module P1. The battery management module P1 may determine whether to send a switch-on instruction to the discharge circuit module P2 and the charge circuit module P3 alternately based on the temperature of the battery pack B1 obtained from the temperature sensor and the first temperature threshold.

A temperature detection unit that may collect the temperature of the battery pack B1 at a certain frequency may be disposed in the battery management module P1. The temperature detection unit may use a thermistor, which may be a Negative Temperature Coefficient (NTC) thermistor, a Positive Temperature Coefficient (PTC) thermistor, etc., which is not limited herein. The temperature of the battery pack B1 may also be uploaded to the battery management module P1 at a certain frequency by a temperature sensor disposed on the surface of the battery pack B1 or inside the battery pack B1, which is not limited here.

The first temperature threshold may be the lowest temperature at which the battery pack B1 may supply power normally. The temperature of the battery pack B1 is lower than the first temperature threshold may indicate that the battery pack B1 enters a low temperature state, and cannot supply power normally in the low temperature state. For example, the first temperature threshold may be set to 0° C. Therefore, in the case that the temperature of the battery pack B1 is lower than the first temperature threshold, the battery pack B1 may be heated to raise the temperature of the battery pack B1, until the temperature of the battery pack B1 reaches a temperature at which the battery pack B1 may supply power normally.

The regulation frequency may be a switching frequency of the discharge circuit module P2 and a switching frequency of the charge circuit module P3. The regulation frequency may be set according to work scenarios and work requirements, which is not limited herein. For example, the regulation frequency may be 50 Hz-20000 Hz. In one example, the switching frequency of the discharge circuit module P2 may be equal to the switching frequency of the charge circuit module P3. The battery management module P1 may send a switch-on instruction to the discharge circuit module P2 and the charge circuit module P3 alternately according to the regulation frequency, and the discharge circuit module P2 and the charge circuit module P3 may be switched-on in turn. That is, the discharging circuit module P2 and the charge circuit module P3 may not be switched on at the same time. It should be noted that the discharge circuit module P2 may be switched on, i.e., the battery group B1 may be connected to the discharge circuit module P2 in series, so that the battery pack B1, the discharge circuit module P2 and the energy storage module P4 may form a pathway circuit. The charge circuit module P3 may be switched on, i.e., the battery pack B1 may be connected to the charge circuit module P3 in series, so that the battery pack B1, the charge circuit module P3 and the energy storage module P4 may form a pathway circuit.

Specifically, the switch-on instruction may be implemented by an impulse voltage. For example, a high level voltage may be a switch-on instruction and a low level voltage may be a switch-off instruction. By setting the impulse voltage, the switching frequency (i.e., the regulation frequency) of the discharging circuit module P2 and the charge circuit module P3 may be adjusted, as so to adjust the transmission of electricity between the battery pack B1 and the energy storage module P4.

In one example, the battery management module P1 described above may also be configured to monitor the state of charge (SOC) of the battery pack B1. The SOC may refer to, at a certain discharge rate, a ratio of the remaining capacity to the rated capacity under the same conditions of the battery pack. If the temperature of the battery pack B1 is lower than the first temperature threshold, and the SOC of the battery pack B1 is higher than a SOC threshold, then a switch-on instruction may be sent to the discharge circuit module P2 and the charge circuit module P3 alternately.

That is, in a scenario where the temperature of the battery pack B1 does not reach the lowest temperature at which the battery pack B1 may supply power normally, it may be further detected that whether the electricity currently stored in the battery pack B1 is sufficient for heating the battery pack B1. The SOC threshold may be a SOC that is able to support the heating of the battery pack. The SOC threshold may be set according to work scenarios and work requirements, which is not limited herein. For example, the SOC threshold may be set to 30%.

In one example, the battery system may also consume a certain amount of electricity for heating the battery B1. The battery management module P1 may also be configured to, if the SOC of the battery pack B1 is lower than a limit SOC threshold, send a switch-off instruction to the discharge circuit module P2 and the charge circuit module P3, so as to disconnect the pathway of the battery pack with the discharge circuit module and the charge circuit module. The limit SOC threshold may be the minimum SOC value that is able to support the heating of the battery pack. It should be noted that the limit SOC threshold may be the same as or different with the SOC threshold described above. The SOC of the battery pack B1 is lower than the limit SOC threshold may indicate that the electricity of the battery pack B1 may be insufficient to heat the battery. Therefore, when the SOC of the battery pack B1 is lower than the limit SOC threshold, the heating of the battery pack B1 may be stopped.

It should be noted that, in order to ensure the safety of a device powered by a battery pack, the device powered by a battery pack may be checked for safety before monitoring the temperature and SOC of the battery pack. When it is determined that the device powered by a battery pack is in a normal operating state, the temperature and SOC of the battery pack may be determined. For example, if the battery pack system is installed inside an electric vehicle, and the battery management module P1 in the battery pack system is a BMS in the electric vehicle, after the battery pack is powered on, the electric vehicle may be tested for insulation and the battery pack may be tested for a high voltage. When it is determined that the electric vehicle is in a normal operating state, the process of heating the battery pack may be started.

In one example, the battery management module P1 may also be configured to, if the temperature of the battery pack B1 is higher than a second temperature threshold, send a switch-off instruction to the discharge circuit module P2 and the charge circuit module P3, so as to disconnect the pathway of the battery pack B1 with the discharge circuit module P2 and the charge circuit module P3.

The second temperature threshold may be a temperature at which the battery pack B1 may resume normal operation. The temperature of the battery pack B1 reaches the second temperature threshold may indicate that the battery pack B1 may have resumed normal operation and the continuous heating of the battery pack B1 may be stopped. Specifically, a switch-off instruction may be sent to the discharge circuit module P2 and the charge circuit module P3 to control the discharge circuit module P2 and the charge circuit module P3 to be switched-off. When the discharge circuit module P2 and the charge circuit module P3 are switch-off, the circuit formed by the battery module B1, the discharge circuit module P2 and the energy storage module P4 may be disconnected, and the circuit formed by the battery module B1, the charge circuit module P3 and the energy storage module P4 may be disconnected. No current flows in disconnected circuits, and the transmission of electricity may be stopped between the battery pack B1 and the energy storage module P4.

The discharge circuit module P2 may be connected to the energy storage module P4, and may be configured to be switched on according to the switch-on instruction so that the electricity of the battery group B1 may flow into the energy storage module P4. As described above, the discharge circuit module P2 may be switched on according to the received switch-on instruction, and the battery pack B1, the discharge circuit module P2, and the energy storage module P4 may form a pathway circuit. The battery pack B1 may discharge, and the electricity discharged by the battery pack B1 may flow into the energy storage module P4. The energy storage module P4 may store the electricity discharged by the battery pack B1. It should be noted that the electricity discharged by the battery pack B1 may be converted into electromagnetic energy and stored in the energy storage module P4.

The charge circuit module P3 may be connected to the energy storage module P4, and may be configured to be switched on according to the switch-on instruction so that the electricity of the energy storage module P4 may flow into the battery group B1. As described above, the charge circuit module P3 may be switched on according to the received switch-on instruction, and the battery pack B1, the charge circuit module P3, and the energy storage module P4 may form a pathway circuit. The energy storage module P4 may discharge, and the electricity discharged by the energy storage module P4 may flow into the battery pack B1 to charge the battery pack B1.

The energy storage module P4 in the above description may be a structure that may be able to store electricity, for example, an inductive element, a capacitive element, a battery, etc., which is not limited herein. Specifically, an energy storage element may convert electrical energy into electromagnetic energy for storing in the energy storage element, and may convert the stored electromagnetic energy into electrical energy for releasing. In one example, by selecting the energy storage module P4 conforming to attribute parameters of work scenarios and work requirements, as well as controlling the magnitude and flow direction of the current in the pathway of the battery pack system, it may be possible to generate an alternating current which may change periodically at the positive and negative electrode of the battery pack B1, to heat the battery pack B1. The energy storage module P4 may comprise a plurality of inductors or capacitors connected in series and/or in parallel, which may reduce the selection requirements of the component parameters in the energy storage module P4.

For example, the energy storage module P4 may comprise an inductance coil, the amount of electromagnetic energy stored in which may as the following formula (1):

$$W=(1/2)I^2L \quad (1)$$

wherein, W is the amount of electromagnetic energy stored in the inductance coil; I is the current in the inductance coil, that is, the current of the pathway formed by the battery pack B1 and the battery pack system; L is the inductance of the inductance coil. The law of the change of current I in the inductance coil over time may as the following formula (2):

$$I(t)=Ie^{-(Rx/L)t} \quad (2)$$

wherein, t is the time; Rx is the internal resistance of the battery pack. From formula (1) and (2), in the process of designing the battery pack system, by selecting a inductance of the inductance coil matching with working scenarios and work requirements, and controlling the current in the pathway formed by the battery pack system, it may be possible to control the heating of the battery pack.

In embodiments of the present disclosure, the discharge circuit module P2 and the charge circuit module P3 may be switched on alternately, so that electricity may be cycled in the battery pack B1 and the energy storage module P4. For the battery pack B1, the battery pack B1 may perform a discharge-charge process circularly, until it may be no longer necessary to heat the battery pack B1. According to the Joule theorem $Q=I^2R \times T$, the battery pack B1 may perform the discharge-charge process circularly, and the current generated during the discharge-charge process performed by the battery pack B1 may continually flow through the internal resistance of the battery pack B1, which may generate heat. In this way, the heat generated inside the battery pack B1 itself may be configured to heat the battery pack B1, providing a new idea for heating the battery pack which may speed up the heating of the battery pack and reduce the time required to heat the battery pack. Wherein Q is the heat generated by the battery pack B1; I is the current flowing through the battery pack B1, that is, the current in the pathway formed by the battery pack system; T is the time that the current flows through the battery pack B1. Moreover, in embodiments of the present disclosure, since the battery pack may be heated by the heat generated by the battery pack itself, the heat generated by the battery pack may be evenly distributed inside each of the single cells of the battery pack, which may implement a uniform heating of the battery pack.

Especially, for a power battery pack with a high voltage, for example, a battery pack of which the voltage may range from tens of volts to hundreds of volts, the current in the pathway formed by the battery pack system may be up to hundreds of amps, when the current of hundreds of amps flows through the internal resistance of the battery pack, more heat may be generated, which may speed up the heating of the battery pack and reduce the time required to heat the battery pack.

In addition, by continuously controlling the discharge circuit module P2 and the charge circuit module P3 to be switched on alternately, that is, the battery pack B1 continuously discharges and charges periodically, an uninterrupted current may be generated in the pathway of the battery pack system, thus it may be possible to generate heat uninterruptedly, which may speed up the heating of the battery pack B1 and reduce the time required to heat the battery pack B1.

Figure 2:
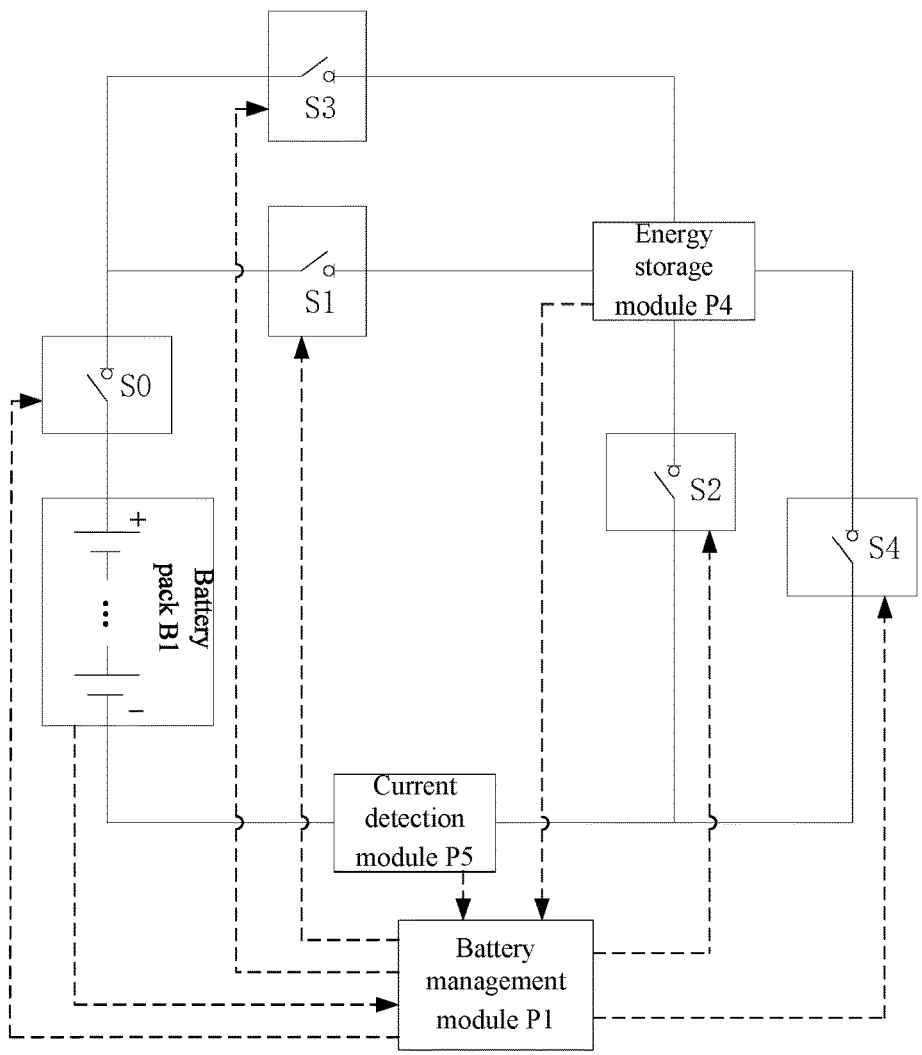
FIG. 2 is an exemplary structure diagram of a battery pack system according to an embodiment of the present disclosure.

FIG. 2 is an exemplary structure diagram of a battery pack system according to an embodiment of the present disclosure. The discharge circuit module P2 shown in FIG. 2 may comprise a first switch S1 and a second switch S2 that may be connected in series. The charge circuit module P3 shown in FIG. 2 may comprise a third switch S3 and a fourth switch S4 that may be connected in series. The battery pack system shown in FIG. 2 may further comprise a master switch module and a current detection module P5. In FIG. 2, a master switch S0 may be taken as an example of the master switch module for illustration.

It should be noted that the dotted arrows in FIG. 2 may refer to communication connections, which may be wired connections or wireless connections and not limited herein. For example, the battery management module P1 may utilize a Controller Area Network (CAN) bus to transmit information to the master switch S0, the first switch S1, the second switch S2, the third switch S3, the fourth switch S4, the energy storage module P4, the current detection module P5, and the battery pack B1. The information transmitted in the communication connections may comprise a switch-on instruction, current information, temperature information, etc., which is not limited herein. The solid line connections in FIG. 2 may refer to electrical connections.

It should be noted that the number of switching devices used in the discharge circuit module P2 and the charge circuit module P3 may be different from those shown in FIG. 2, or other elements with similar functions may be configured to replace the above switching devices, which is not limited herein.

The master switch module may be connected to the battery pack B1, and may be configured to control whether the electricity of the battery pack B1 flows into the discharge circuit module P2 or the charge circuit module P3. The battery management module P1 may control the switching of the pathway of the battery pack system by controlling the master switch module. The master switch module may also separate the battery pack system from other power circuit and power driving part in a device powered by the battery pack B1, so as to avoid that, in a scenario where it may be not necessary to use the battery pack system to heat the battery pack B1, the battery pack system may have a harmful effect on the other power circuit and power driving part in a device powered by the battery pack B1.

Both the first switch S1 and the second switch S2 in the discharge circuit module P2 may be connected to the energy storage module P4, wherein the first switch S1 may be connected to one end of the battery pack B1, while the second switch S2 may be connected to the other end of the battery pack B1.

The discharge circuit module P2 may be switched on, that is, both the first switch S1 and the second switch S2 may be closed. The discharge circuit module P2 may be switched off, that is, both the first switch S1 and the second switch S2 may be open. The discharge circuit module P2 may be switched on, and the direction in which the current flows may be from the positive electrode of the battery pack B1 to the master switch S0, the first switch S1, the energy storage module P4, the second switch S2, the current detection module P5, and the negative electrode of the battery pack B1.

Both the third switch S3 and the fourth switch S4 in the charge circuit module P3 may be connected to the energy storage module P4, wherein the third switch S3 may be connected to one end of the battery pack, while the fourth switch S4 may be connected to the other end of the battery pack.

The charge circuit module P3 may be switched on, that is, both the third switch S3 and the fourth switch S4 may be closed. The charge circuit module P3 may be switched off, that is, both the third switch S3 and the fourth switch S4 may be open. The charge circuit module P3 may be switched on, and the direction in which the current flows may be from one end of the energy storage device to the third switch S3, the master switch S0, the positive electrode of the battery pack B1, the negative electrode of the battery pack B1, the current detection module P5, the fourth switch S4 and the other end of the energy storage module P4.

It should be noted that the regulation frequency in the above embodiments may be considered as the switching frequency of the switching devices in the discharge circuit module P2 and the charge circuit module P3. For example, in FIG. 2, the regulation frequency may be the switching frequency of the first switch S1, the second switch S2, the third switch S3, and the fourth switch S4.

It should be noted that, in a scenario in which the current of the pathway of the battery pack system is large, for example, several hundreds of amps, in order to ensure the normal operation and safety of the battery pack system, the switching devices in the master switch module and the discharge circuit module P2, for example, the master switch S0, the first switch S1, and the second switch S2 in FIG. 2, may specifically be high-power switching devices, such as a metal oxide semiconductor (MOS) transistor, a relay, or an insulated gate bipolar transistor (IGBT) transistor, etc. The switching devices in the charge circuit module P3, such as the third switch S3 and the fourth switch S4 in FIG. 2, may be a power MOS transistor, an IGBT, a high power diode or a fast recovery diode, etc.

The current detection module P5 may be connected to the battery pack B1, the battery management module P1, the discharge circuit module P2, and the charge circuit module P3, and may be configured to collect the monitored current and send the value of the monitored current to the battery management module P1. The monitored current may be the current of the pathway formed by the battery pack B1 and the discharge circuit module P2 and the current of the pathway formed by the battery pack B1 and the charge circuit module P3, respectively.

In FIG. 2, the current detection module P5 may be connected to the negative electrode of the battery pack B1, the second switch S2, and the fourth switch S4. For example, the current detection module P5 may be a Current Sensor Unit (CSU). In the case that the discharge circuit module P2 is switched on, the current detection module P5 may collect the current in the pathway circuit formed by the battery pack B1, the master switch S0, the first switch S1, the energy storage module P4, and the second switch S2. It should be noted that the current detection module P5 may also be located in the pathway circuit formed by the discharge circuit module P2 when it is switched on. In the case that the charge circuit module P3 is switched on, the current detection module P5 may collect the current in the pathway circuit formed by the energy storage module P4, the third switch S3, the master switch S0, the battery pack B1, and the fourth switch S4. It should be noted that the current detection module P5 may also be located in the pathway circuit formed by the charge circuit module P3 when it is switched on.

After the battery management module P1 acquires the value of the monitored current, a current control parameter may be adjusted according to the value of the monitored current and a preset desired current value, so that the value of the monitored current may reach the desired current value.

The desired current value may be the value of a current that may heat the battery pack B1 stably. The desired current value may be selected and set according to work scenarios and work requirements, which is not limited herein. The current control parameter may be an attribute parameter for controlling current changes, for example, the current control parameter may comprise the regulation frequency and/or a discharge-charge duty cycle. The discharge-charge duty cycle may be a ratio of the duration when the discharge circuit module P2 is switched on to the duration of the heating cycle. The duration of the heating cycle may be the sum of the duration when the discharge circuit module P2 is switched on and the duration when the charge circuit module P3 is switched on. The duration when the discharge circuit module P2 is switched on may be duration when the battery pack B1 discharges. The duration when the charge circuit module P3 is switched on may be the duration when the battery pack B1 charges.

Wherein, the regulation frequency may be inversely proportional to the value of the monitored current. The discharge-charge duty cycle may be directly proportional to the value of the monitored current. The influence of the current control parameter on the monitored current will be exemplified below. For example, the energy storage module P4 may be an inductive element, and the inductance of which may be L1. Setting the monitored current as I, the regulation frequency as f, the duration of the discharge of the battery pack as t0, and the duration of the charge of the battery pack as t1. The discharge-charge duty cycle may be D, then D=t0/(t0+t1). Assuming that the voltage of the battery pack is U1, then the relationship between the monitored current and the voltage of the battery pack during the discharge of the battery pack may as formula (3):

$$U1 = L1 \times \frac{di}{dt} \tag{3}$$

wherein both the inductance L1 and the voltage U1 may remain the same. Within the time t0 of the discharge of the battery pack, the value of the monitored current may rise from 0 to Ip1=t0×(U1/L1) with a speed K1=U1/L1. At the instant of entering the charge stage of the battery pack, the magnitude of the monitored current may remain the same, but the direction of the monitored current may be opposite to the direction when the battery pack discharges. Within the time t1 of the charge of the battery pack, the value of the monitored current may drop from −Ip1 to zero with the speed K1. During the above discharge process and charge process of one battery pack, the current in the pathway formed by the battery pack system, i.e., the monitored current I, may be calculated as formula (4):

$$\tfrac{1}{2} \times Ip1 \times t0 + \tfrac{1}{2} \times Ip1 \times t1 = I \times (t0+t1) \tag{4}$$

For Ip1, it may be calculated as formula (5):

$$Ip1 = t0 \times \frac{U1}{L1} \tag{5}$$

Substituting formula (5) into formula (4) may yield formula (6):

$$I = \frac{U1 \times t0}{2 \times L1} \tag{6}$$

It may be seen from the formula (6) that the monitored current I may be positively correlated with the duration t0 of the discharge of the battery pack. Since t0+t1=1/f, and the discharge-charge duty cycle D=t0/(t0+t1), thus the value of the monitored current I may be inversely proportional to the regulation frequency f, and the value of the monitored current I may be directly proportional to the discharge-charge duty cycle D. It should be noted that in order to ensure that the energy stored in the energy storage module P4 may be completely released during each discharge-charge process of the battery pack, D≤50%.

Therefore, if the value of the monitored current acquired by the current detection module P5 is lower than the desired current value, the regulation frequency may be reduced and/or the discharge-charge duty cycle may be increased to increase the monitored current. If the value of the monitored current acquired by the current detection module P5 is higher than the desired current value, the regulation frequency may be increased and/or the discharge-charge duty cycle may be decreased to reduce the monitored current.

The value of the monitored current may be adjusted by adjusting the current control parameter. According to the Joule theorem, the value of the monitored current may be directly proportional to the heat generated by the battery pack. By adjusting the value of the monitored current, the heat generated by the battery pack in a fixed period of time may be adjusted. That is, the heating rate of the heating of the battery pack may be adjusted. By adjusting the value of the monitored current to the desired current value, the heating speed of the battery pack may be adjusted to a stable range, thereby ensuring that the heating of the battery pack may be stable and safe, and satisfy a battery pack standard.

In order to ensure the safety of heating process of the battery pack B1 by the battery pack system, after the battery management module P1 acquires the value of the monitored current, the battery management module P1 may also be configured to send a switch-off instruction to the master switch module if the value of the monitored current exceeds a safety threshold range, so as to disconnect the pathway of the battery pack B1 with the discharge circuit module P2 and the charge circuit module P3. Alternatively, if the value of the monitored current exceeds the safety threshold range, a switch-off instruction may be sent to the discharge circuit module P2 and the charge circuit module P3 to disconnect the pathway of the battery pack B1 with the discharge circuit module P2 and the charge circuit module P3. Alternatively, if the value of the monitored current exceeds the safety threshold range, a switch-off instruction may be sent to the master switch module, the discharge circuit module P2 and the charge circuit module P3 to disconnect the pathway of the battery pack B1 with the discharge circuit module P2 and the charge circuit module P3. The battery management module P1 may send a switch-off instruction to the master switch module first, and then send a switch-off instruction to the discharge circuit module P2 and the charge circuit module P3, as so to switch off the master switch module first, and then to switch off the discharge circuit module P2 and the charge circuit module P3. Wherein, the safety threshold range may be a range of safety currents that the battery pack system may withstand, which may be specifically set according to work scenario sand work requirements, which is not limited herein.

The value of the monitored current exceeds the safety threshold range may indicate that the battery pack system may have failed. It may be necessary to cut off the internal pathway of the battery pack system. That is, the circuit inside the battery pack system may be disconnected. The battery management module P1 may also record faults for a user or operator to check as well as repair or inspect based on the faults recorded.

In one example, in order for the battery management module P1 to acquire an accurate value of the monitored current, a battery management module P1 of which the frequency configured to acquire the monitored current may reach a range of 1,000 Hz (Hertz) to 1,000,000 Hz may be selected. Therefore, the battery management module P1 may acquire the monitored current quickly, and according to monitored current acquired by a high-frequency, the current of the pathway formed by the battery system may be obtained more accurately. Thus, in the above scenario of adjusting the monitored current and monitoring whether the value of the monitored current exceeds the safety threshold range, the accuracy and precision of the determination may be improved, so as to ensure that the battery pack B1 may be heated stably and safely.

It may also be possible to dispose temperature sensors in each module of the battery pack system to monitor the temperature of each module of the battery pack system. The battery management module P1 may also be configured to monitor an element temperature parameter, and send a switch-off instruction to the master switch module and/or the discharge circuit module P2 and the charge circuit module P3 if the element temperature parameter exceeds an element temperature threshold range to disconnect the pathway of the battery pack B1 with the discharge circuit module P2 and the charge circuit module P3. Wherein, the element temperature parameter may comprise at least one of: the temperature of the discharge circuit module P2, the temperature of the charge circuit module P3, the temperature of the energy storage module P4, and the temperature of the master switch module.

The element temperature threshold range may be a temperature range that the element may operate safely. If the element temperature parameter exceeds the element temperature threshold range, the battery pack system may fail. It may be necessary to cut off the internal pathway of the battery pack system. That is, the pathway inside the battery pack system may be disconnected. The battery management module P1 may also record faults for a user or operator to check as well as repair or inspect based on the faults recorded.

By monitoring the element temperature parameter of each module of the battery pack system, it may be determined whether the battery pack system may operate safely. If the element temperature parameter exceeds the element temperature threshold range, the pathway inside the battery pack system may be cut off in time to stop the heating of the battery pack B1. In this manner, it may be avoided that the battery pack system may be damaged more severely to ensure that the battery pack system may operate stably and safely.

Figure 3:
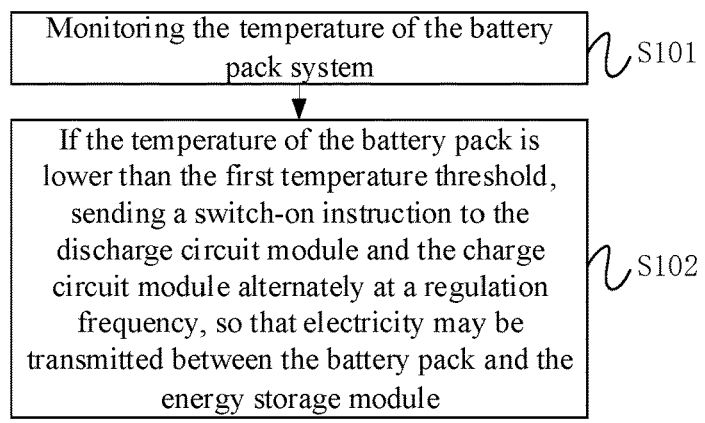
FIG. 3 is a flow chart of a control method of a battery pack system according to an embodiment of the present disclosure.

FIG. 3 is a flow chart of a control method of a battery pack system according to an embodiment of the present disclosure, which may be applied to the battery pack system in the above embodiments. The control method of the battery pack system may be performed by a battery management module in the battery pack system. In one example, the battery pack system may be mounted inside an electric vehicle, and the control method of the battery pack system may be performed by a BMS in the electric vehicle. As shown in FIG. 3, the control method of the battery pack system may comprise step S101 and step S102.

In step S101, the temperature of the battery pack system may be monitored.

In step S102, if the temperature of the battery pack is lower than the first temperature threshold, a switch-on instruction may be sent to the discharge circuit module and the charge circuit module alternately according a regulation frequency, so that electricity may be transmitted between the battery pack and the energy storage module.

The mutual transmission of the electricity between the battery pack and the energy storage module may comprise a plurality of cycles that the electricity of the battery pack flows into the energy storage module and the electricity of the energy storage module flows into the battery pack.

In the battery pack system as shown in FIG. 2, if the temperature of the battery pack is lower than the first temperature threshold, the battery management module may send a switch-on instruction to the master switch module first to switch on the master switch module. The battery management module may send a switch-on instruction to the first switch and the second switch in the discharge circuit module, so as to switch on the first switch and the second switch and enable a series connection of the battery pack, the discharge circuit module and the energy storage module. Then, the battery management module may stop sending the switch-on instruction to the first switch and the second switch in the discharge circuit module. The battery management module may send a switch-on instruction to the third switch and the fourth switch in the charge circuit module, so as to switch on the third switch and the fourth switch, and enable a series connection of the energy storage module, the charge circuit module, and the battery pack. According to the regulation frequency, the discharge circuit module and the charge circuit module may be switched on alternately.

Figure 4:
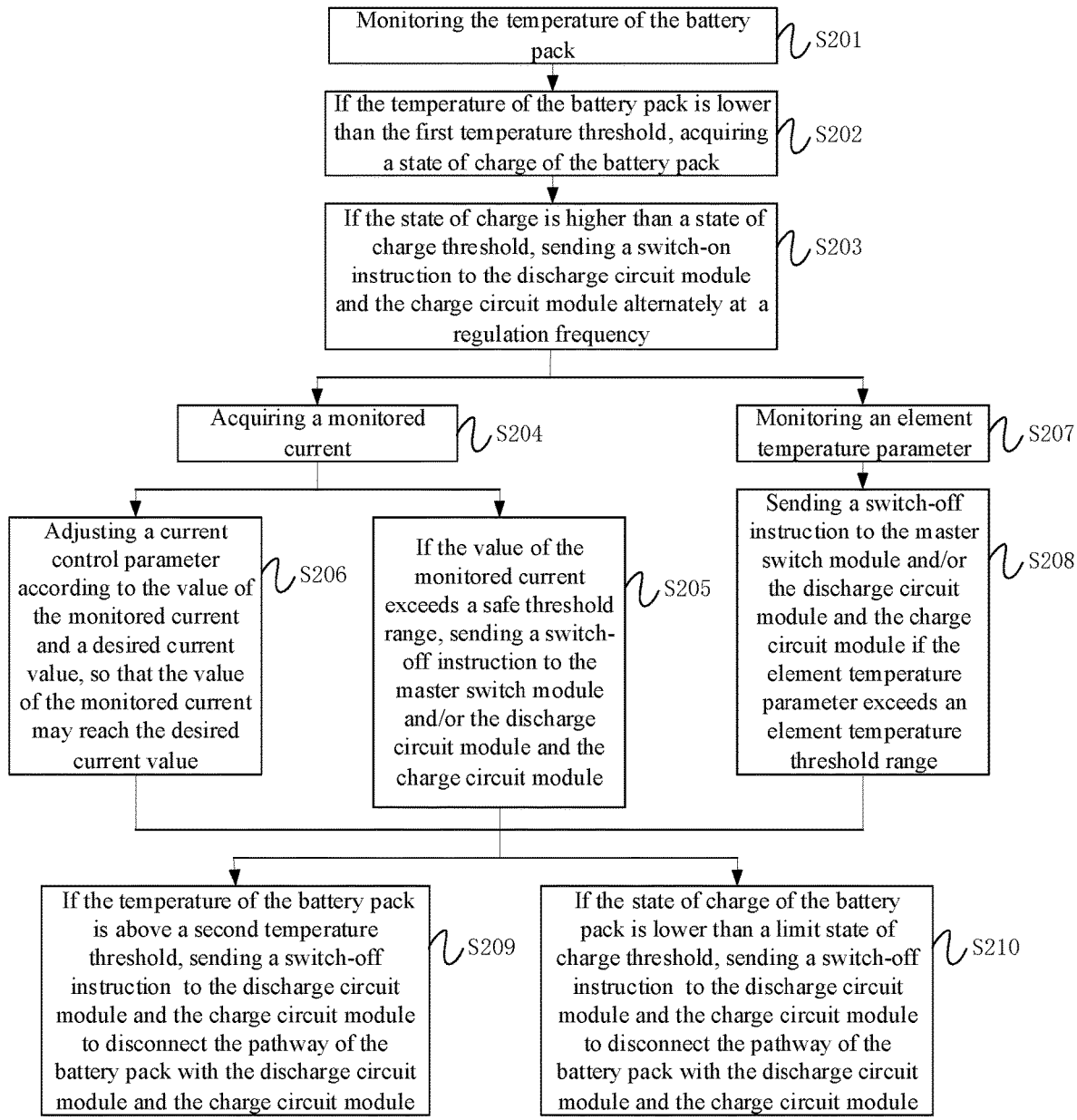
FIG. 4 is a flow chart of a control method of a battery pack system according to another embodiment of the present disclosure.

FIG. 4 is a flow chart of a control method of a battery pack system according to another embodiment of the present disclosure. As shown in FIG. 4, the control method of the battery pack system may comprise step S201 to step S210.

In step S201, the temperature of the battery pack may be monitored.

In step S202, if the temperature of the battery pack is lower than the first temperature threshold, a state of charge of the battery pack may be acquired.

In step S203, if the state of charge is higher than a state of charge threshold, a switch-on instruction may be sent to the discharge circuit module and the charge circuit module alternately at a regulation frequency.

In step S204, a monitored current may be acquired.

Wherein the monitored current may be the current of the pathway formed by the battery pack and the discharge circuit module and the current of the pathway formed by the battery pack and the charge circuit module, respectively. In one example, the range of the frequency configured to acquire the monitored current may be 1,000 Hz to 1,000,000 Hz.

In step S205, if the value of the monitored current exceeds a safety threshold range, a switch-off instruction may be sent to the master switch module and/or the discharge circuit module and the charge circuit module.

Wherein the purpose of sending the switch-off instruction to the master switch module and/or the discharge circuit module and the charge circuit module may be to disconnect the pathway of the battery pack with the discharge circuit module and the charge circuit module.

In step S206, a current control parameter may be adjusted according to the value of the monitored current and a desired current value, so that the value of the monitored current may reach the desired current value.

Wherein the current control parameter may comprise the regulation frequency and/or a discharge-charge duty cycle. The discharge-charge duty cycle may be a ratio of duration when the discharge circuit module is switched on to the duration of the heating cycle. The duration of the heating cycle may be the sum of the duration when the discharge circuit module is switched on and the duration when the charge circuit module is switched on.

In particular, if the value of the monitored current is lower than the desired current value, the regulation frequency may be decreased and/or the discharge-charge duty cycle may be increased. If the value of the monitored current is higher than the desired current value, the regulation frequency may be increased and/or the discharge-charge duty cycle may be decreased.

In step 207, an element temperature parameter may be monitored.

Wherein the element temperature parameter may comprise at least one of: the temperature of the discharge circuit module, the temperature of the charge circuit module, the temperature of the energy storage module, and the temperature of the master switch module.

In step 208, a switch-off instruction may be sent to the master switch module and/or the discharge circuit module and the charge circuit module if the element temperature parameter exceeds an element temperature threshold range to disconnect the pathway of the battery pack with the discharge circuit module and the charge circuit module.

In step 209, if the temperature of the battery pack is above a second temperature threshold, a switch-off instruction may be sent to the discharge circuit module and the charge circuit module to disconnect the pathway of the battery pack with the discharge circuit module and the charge circuit module.

In step 210, if the state of charge of the battery pack is lower than a limit state of charge threshold, a switch-off instruction may be sent to the discharge circuit module and the charge circuit module to disconnect the pathway of the battery pack with the discharge circuit module and the charge circuit module.

The specific description and beneficial effects of the steps of the above control method of the battery pack system may refer to the related contents of the battery pack system in the above embodiments, which will not be described herein.

Figure 5:
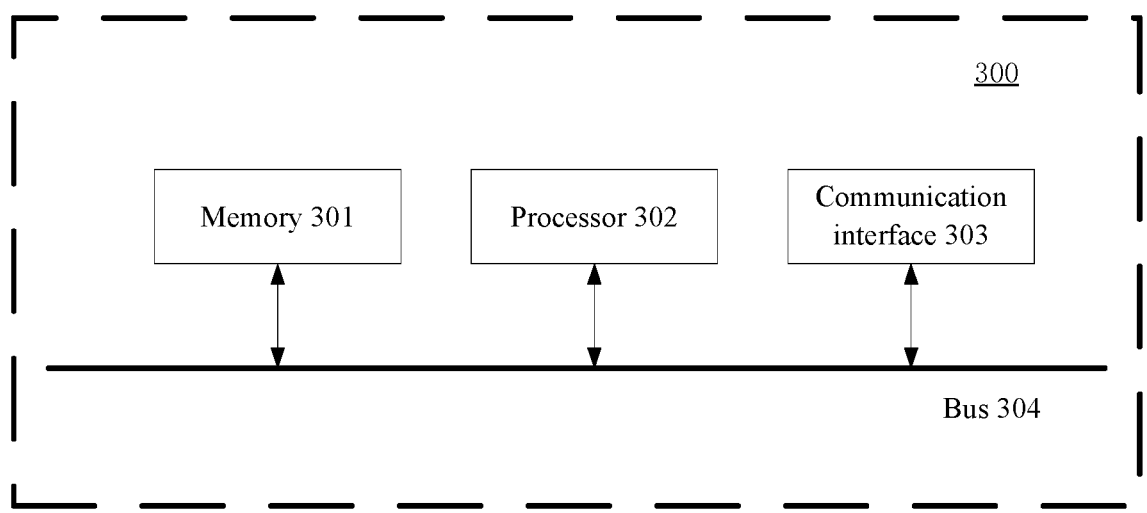
FIG. 5 is a hardware structure diagram of a management device according to an embodiment of the present disclosure.

The battery pack system and its control method according to the embodiments of the present disclosure described with reference to FIG. 1 to FIG. 4 may be implemented by a management device. FIG. 5 is a hardware structure diagram of a management device 300 according to an embodiment of the present disclosure.

The management device may comprise a memory 301, a processor 302, and a computer program stored on the memory 301 and operable on the processor 302.

In one example, the processor 302 described above may comprise a central processing unit (CPU), or a specific integrated circuit (ASIC), or may be configured to implement one or more integrated circuits according to the embodiments of the present disclosure.

The memory 301 may comprise a large-scale memory for data or instructions. For example, and not limiting, the memory 301 may comprise an HDD, a floppy disk drive, a flash memory, an optical disk, a magneto-optical disk, a magnetic tape, or a universal serial bus (USB) drive, or a combination of two or more thereof. The memory 301 may comprise removable or non-removable (or fixed) media, where appropriate. The memory 301 may be inside or outside the management device 300, where appropriate. In particular embodiments, the memory 301 may be a non-volatile solid-state memory. In particular embodiments, the memory 301 may comprise a read only memory (ROM). The ROM may be a mask programmed ROM, a programmable ROM (PROM), an erasable PROM (EPROM), an electrically erasable PROM (EEPROM), an electrically rewritable ROM (EAROM) or a flash memory, or a combination of two or more thereof, where appropriate.

The processor 302 may run a program corresponding to an executable program code by reading the executable program code stored in the memory 301 for performing the control method of the battery pack system in each of the above embodiments.

In one example, the management device 300 may also comprise a communication interface 303 and a bus 304. Wherein, as shown in FIG. 5, the memory 301, the processor 302, and the communication interface 303 may be connected via the bus 304 and communicate with each other.

The communication interface 303 may be mainly configured to implement the communication among various modules, apparatuses, units and/or devices in the embodiments of the present disclosure. The input device and/or the output device may also be accessed via the communication interface 303.

The bus 304 may comprise hardware, software, or both, coupling the components of the management device 300 to each other. For example, and not limiting, the bus 304 may comprise an accelerated graphic port (AGP) or other graphic bus, an enhanced industry standard architecture (EISA) bus, a front-end bus (FSB), a Hyper-Transport (HT) interconnect, an industry standard architecture (ISA)) bus, an infiniband interconnect, a Low Pin Count (LPC) bus, a Memory Bus, a Micro Channel Architecture (MCA) bus, a Peripheral Component Interconnect (PCI) bus, a PCI-Express (PCI-E) bus, a Serial Advanced Technical Attachment (SATA) bus, a Video Electronics Standards Association Local (VLB) bus or other suitable buses, or a combination of two or more thereof. The bus 304 may comprise one or more buses, where appropriate. Although the embodiments of the present disclosure may describe and illustrate a particular bus, the present disclosure may contemplate any suitable bus or interconnect.

An embodiment of the present disclosure may further provide a storage medium on which a program is stored, when executed by a processor, the program may implement the control method of the battery pack system in each of the above embodiments.

Various parts of the specification are described in a progressive manner, and the same or similar parts of the various embodiments may refer to each other, while each embodiment focuses on a different aspect from the other embodiments. In particular, for the method embodiment, device embodiment and storage medium embodiment, since they are substantially similar to the battery pack system embodiment, the description of the method embodiment, device embodiment and storage medium embodiment is relatively simple, and the related parts may refer to the description of the battery pack system embodiment.

The foregoing is merely a specific implementation of the present disclosure, and the scope of protection of the present disclosure is not limited thereto. Any person skilled in the art may easily think of a change or a replacement without departing from the scope disclosed by the present disclosure, and all the changes and replacements will be covered within the scope of the present disclosure. Therefore, the scope of protection of present disclosure shall be subject to the scope of protection of the claims.

What is claimed is:

1. A battery pack system, comprising: a battery pack, a battery management module, a discharge circuit module, a charge circuit module and an energy storage module, wherein
the battery management module is connected to the discharge circuit module, the charge circuit module and the battery pack, and configured to monitor a temperature of the battery pack, and if the temperature of the battery pack is lower than a first temperature threshold, send a switch-on instruction to the discharge circuit module and the charge circuit module alternately at a regulation frequency, so as to control the discharge circuit module and the charge circuit module to be switched on alternately;
the discharge circuit module is configured to switch on according to the switch-on instruction, wherein the battery pack, the discharge circuit module and the energy storage module form a pathway circuit, to enable electricity of the battery pack to flow into the energy storage module;
the charge circuit module is configured to switch on according to the switch-on instruction, wherein the battery pack, the charge circuit module and the energy storage module form a pathway circuit, to enable electricity of the energy storage module to flow into the battery pack; and
the energy storage module is configured to store and release electricity;
the battery pack system further comprises a current detection module, which is connected to the battery pack, the battery management module, the discharge circuit module, and the charge circuit module, and configured to collect a monitored current and send a value of the monitored current to the battery management module, the monitored current is a current of a pathway formed by the battery pack and the discharge circuit module and a current of a pathway formed by the battery pack and the charge circuit module, respectively; and
the battery management module is further configured to adjust a current control parameter according to the value of the monitored current and a desired current value, so that the value of the monitored current reaches the desired current value.

2. The battery pack system of claim 1, wherein the battery management module is further configured to monitor a state of charge of the battery pack, and if the temperature of the battery pack is lower than the first temperature threshold and the state of charge of the battery pack is higher than a state of charge threshold, send the switch-on instruction to the discharge circuit module and the charge circuit module alternately.

3. The battery pack system of claim 1, wherein the battery management module is further configured to, if the temperature of the battery pack is higher than a second temperature threshold, send a switch-off instruction to the discharge circuit module and the charge circuit module, so as to disconnect a pathway of the battery pack with the discharge circuit module and the charge circuit module; and/or
the battery management module is further configured to, if the state of charge of the battery pack is lower than a limit state of charge threshold, send a switch-off instruction to the discharge circuit module and the charge circuit module, so as to disconnect a pathway of the battery pack with the discharge circuit module and the charge circuit module.

4. The battery pack system of claim 1, wherein the battery pack system further comprises a master switch module, which is connected to the battery pack and configured to control whether the electricity of the battery pack flows into the discharge circuit module or the charge circuit module.

5. The battery pack system of claim 4, wherein the battery management module is further configured to monitor an element temperature parameter, and send a switch-off instruction to the master switch module and/or the discharge circuit module and the charge circuit module if the element temperature parameter exceeds an element temperature threshold range, to disconnect a pathway of the battery pack with the discharge circuit module and the charge circuit module, wherein the element temperature parameter comprises at least one of: a temperature of the discharge circuit module, a temperature of the charge circuit module, a temperature of the energy storage module, and a temperature of the master switch module.

6. The battery pack system of claim 1, wherein a range of a frequency at which the current detection module collects the monitored current is 1,000 Hz to 1,000,000 Hz.

7. The battery pack system of claim 1, wherein the current control parameter comprises the regulation frequency and/or a discharge-charge duty cycle, the discharge-charge duty cycle is a ratio of a duration when the discharge circuit module is switched on to a duration of a heating cycle, and the duration of the heating cycle is a sum of the duration when the discharge circuit module is switched on and a duration when the charge circuit module is switched on.

8. The battery pack system of claim 7, wherein the battery management module is further configured to decrease the regulation frequency and/or increase the discharge-charge duty cycle if the value of the monitored current is lower than the desired current value; and the battery management module is further configured to increase the regulation frequency and/or decrease the discharge-charge duty cycle if the value of the monitored current is higher than the desired current value.

9. The battery pack system of claim 1, wherein the battery management module is further configured to send a switch-off instruction to the master switch module and/or the discharge circuit module and the charge circuit module if the value of the monitored current exceeds a safety threshold range, so as to disconnect a pathway of the battery pack with the discharge circuit module and the charge circuit module.

10. A control method for the battery pack system of claim 1, comprising:

monitoring the temperature of the battery pack; and sending the switch-on instruction to the discharge circuit module and the charge circuit module alternately at the regulation frequency if the temperature of the battery pack is lower than the first temperature threshold, wherein the battery pack, the discharge circuit module and the energy storage module form a pathway circuit, to enable electricity of the battery pack to flow into the energy storage module, when the discharge circuit module is switched on according to the switch-on instruction, and wherein the battery pack, the charge circuit module and the energy storage module form a pathway circuit, to enable electricity of the energy storage module to flow into the battery pack, when the charge circuit module is switched on according to the switch-on instruction;

collecting a monitored current, wherein the monitored current is a current of a pathway formed by the battery pack and the discharge circuit module and a current of a pathway formed by the battery pack and the charge circuit module, respectively; and adjusting a current parameter according to a value of the monitored current and a desired current value, so that the value of the monitored current reaches the desired current value.

11. The control method for the battery pack system of claim 10, wherein sending the switch-on instruction to the discharge circuit module and the charge circuit module alternately at the regulation frequency if the temperature of the battery pack is lower than the first temperature threshold comprises:

acquiring a state of charge of the battery pack if the temperature of the battery pack is lower than the first temperature threshold; and sending the switch-on instruction to the discharge circuit module and the charge circuit module alternately at the regulation frequency if the state of charge of the battery pack is higher than a state of charge threshold.

12. The control method for the battery pack system of claim 10, wherein sending the switch-on instruction to the discharge circuit module and the charge circuit module alternately at the regulation frequency if the temperature of the battery pack is lower than the first temperature threshold comprises:

sending a switch-on instruction to a master switch module to switch on the master switch module if the temperature of the battery pack is lower than the first temperature threshold; and sending the switch-on instruction to the discharge circuit module and the charge circuit module alternately at the regulation frequency.

13. The control method for the battery pack system of claim 12, further comprising:

sending a switch-off instruction to the master switch module and/or the discharge circuit module and the charge circuit module if the value of the monitored current exceeds a safety threshold range, so as to disconnect a pathway of the battery pack with the discharge circuit module and the charge circuit module.

14. The control method for the battery pack system of claim 10, wherein a range of a frequency at which the monitored current is collected is 1,000 Hz to 1,000,000 Hz.

15. The control method for the battery pack system of claim 10, wherein the current parameter comprises the regulation frequency and/or a discharge-charge duty cycle, the discharge-charge duty cycle is a ratio of a duration when the discharge circuit module is switched on to a duration of a heating cycle, and the duration of the heating cycle is a sum of the duration when the discharge circuit module is switched on and a duration when the charge circuit module is switched on.

16. The control method for the battery pack system of claim 15, wherein adjusting the current parameter according to the value of the monitored current and the desired current value comprises:

decreasing the regulation frequency and/or increasing the discharge-charge duty cycle if the value of the monitored current is lower than the desired current value; and increasing the regulation frequency and/or decreasing the discharge-charge duty cycle if the value of the monitored current is higher than the desired current value.

17. A management device comprising a memory, a processor, and a program stored in the memory and executable on the processor, wherein the processor, when executing the program, implements the control method for the battery pack system of claim 10.

* * * * *